United States Patent
Gaulier et al.

(10) Patent No.: US 10,677,286 B2
(45) Date of Patent: Jun. 9, 2020

(54) HYDRODYNAMIC BEARING WITH INJECTORS AND DEFLECTORS

(71) Applicant: FLENDER-GRAFFENSTADEN S.A.S., Illkirch-Graffenstaden (FR)

(72) Inventors: Thomas Gaulier, Wolfisheim (FR); Pierre Hamy, Strasbourg (FR); Eric Jallat, Illkirch-Graffenstaden (FR)

(73) Assignee: Flender-Graffenstaden S.A.S., Illkirch-Graffenstade (FR)

( * ) Notice: Subject to any disclaimer, the term of this patent is extended or adjusted under 35 U.S.C. 154(b) by 0 days.

(21) Appl. No.: 16/304,310

(22) PCT Filed: May 9, 2017

(86) PCT No.: PCT/EP2017/060987
§ 371 (c)(1),
(2) Date: Dec. 21, 2018

(87) PCT Pub. No.: WO2017/202598
PCT Pub. Date: Nov. 30, 2017

(65) Prior Publication Data
US 2019/0136907 A1  May 9, 2019

(30) Foreign Application Priority Data

May 26, 2016 (EP) .................................. 16290090

(51) Int. Cl.
*F16C 17/03* (2006.01)
*F16C 33/10* (2006.01)
*F16C 32/06* (2006.01)

(52) U.S. Cl.
CPC .......... *F16C 17/03* (2013.01); *F16C 32/0651* (2013.01); *F16C 32/0666* (2013.01);
(Continued)

(58) Field of Classification Search
CPC .... F16C 17/03; F16C 17/105; F16C 33/1045; F16C 33/1065; F16C 33/1075;
(Continued)

(56) References Cited

U.S. PATENT DOCUMENTS 3,318,643 A * 5/1967 Pilarczyk ................ F16C 17/03
384/312
3,756,673 A * 9/1973 Strub ...................... F16C 17/03
384/117

(Continued)

FOREIGN PATENT DOCUMENTS

CN 100546733 C 10/2009
CN 103517762 A 1/2014
(Continued)

*Primary Examiner* — Marcus Charles
(74) *Attorney, Agent, or Firm* — Laurence Greenberg; Werner Stemer; Ralph Locher

(57) ABSTRACT

A hydrodynamic bearing contains a body of which an inner surface forms a cavity arranged to accommodate and surround a rotary shaft. The cavity has a plurality of pads installed on the inner surface so as to support and guide the rotary shaft in rotation in a direction of rotation w from "upstream" to "downstream". Each pad has an upper surface of which one portion, referred to as the "active surface", acts as a sliding surface for the rotary shaft. The bearing having at least one pad included in an active angular sector of the bearing and at least one pad included in a passive angular sector of the bearing such that the active surface of each pad of the passive angular sector is lower than the active surface of each of the pads of the active angular sector.

14 Claims, 4 Drawing Sheets

(52) U.S. Cl.
CPC ........ *F16C 33/108* (2013.01); *F16C 33/1045* (2013.01); *F16C 33/1065* (2013.01); *F16C 33/1075* (2013.01); *F16C 2361/61* (2013.01)

(58) Field of Classification Search
CPC .................................................. F16C 33/108; F16C 32/0651; F16C 32/0666; F16C 32/0068; F16C 2361/61
USPC ....... 384/100, 103, 116, 120, 312, 316, 322, 384/392–393
See application file for complete search history.

(56) References Cited

U.S. PATENT DOCUMENTS

| | | | |
|---|---|---|---|
| 3,891,281 A * | 6/1975 | Jenness | F16C 13/04 384/307 |
| 4,600,317 A | 7/1986 | Mori | |
| 4,815,865 A * | 3/1989 | Gerling | F16C 17/03 384/117 |
| 5,030,015 A * | 7/1991 | Baker | F16C 17/03 384/117 |
| 5,879,085 A | 3/1999 | Ball et al. | |
| 5,951,172 A | 9/1999 | Byrne | |
| 6,361,215 B1 * | 3/2002 | Wilkes | F16C 17/03 384/117 |
| 6,623,164 B1 * | 9/2003 | Gozdawa | F16C 17/03 384/117 |
| 7,611,286 B2 * | 11/2009 | Swann | F16C 17/03 384/119 |
| 8,371,756 B2 * | 2/2013 | Waki | F16C 17/03 384/215 |
| 8,500,333 B2 * | 8/2013 | Osgood | F16C 23/046 384/192 |
| 8,734,019 B2 * | 5/2014 | Palomba | F16C 43/02 384/117 |
| 9,416,820 B2 * | 8/2016 | Ertas | F16C 32/0662 |
| 9,625,916 B2 | 4/2017 | Garcia da Fonseca et al. | |
| 2002/0018604 A1 | 2/2002 | Weissbacher | |
| 2008/0125297 A1 | 5/2008 | Faure et al. | |

FOREIGN PATENT DOCUMENTS

| | | |
|---|---|---|
| CN | 103517762 B | 12/2015 |
| EP | 0298835 A1 | 1/1989 |
| EP | 3067577 A1 | 9/2016 |

\* cited by examiner

HYDRODYNAMIC BEARING WITH INJECTORS AND DEFLECTORS

CROSS-REFERENCE TO RELATED APPLICATION

This application is a continuation, under 35 U.S.C. § 120, of copending international application No. PCT/EP2017/060987, filed May 9, 2017, which designated the United States; this application also claims the priority, under 35 U.S.C. § 119, of European patent application No. EP 16 290 090, filed May 26, 2016; the prior applications are herewith incorporated by reference in their entireties.

BACKGROUND OF THE INVENTION

Field of the Invention

The present invention relates to a hydrodynamic bearing that is designed to bear a rotor or rotary shaft according to the preamble of the independent claim.

The present invention relates in particular to hydrodynamic bearings that are able to bear a rotor or rotary shaft and to guide same in rotation, such as the bearings commonly used to bear high-speed/high-power rotary shafts (reduction gear or step-up gear) for the gas and oil energy market. The bearings according to the invention are particularly suited to use with high radial loads and high shaft speeds.

Such a bearing is for example described in patent application US 2002/0018604 A1. Such a bearing is typically formed by a body with an inner surface forming a circular cavity arranged to receive a rotary shaft, for example the rotary shaft of a pinion of a reduction gear, such as to bear said shaft and guide same in rotation. Said inner surface forming said circular cavity can for example act as a sliding surface for said rotary shaft. In other variants, said body of said bearing can for example include pads distributed about the inner surface of said body, said pads having a substantially arched surface that is oriented toward the center of the cavity and acts as a sliding surface for said rotary shaft. Normally, a lubricant supply device enables the lubrication of the interstices separating the outer surface of the rotary shaft from said sliding surface and the formation of a lubricant film between the outer surface of said shaft and each sliding surface when said shaft is in rotation at a rotational speed greater than a limit speed defined by the dimensioning of the bearing and of the shaft, said lubricant (for example the viscosity thereof), geometry and the forces involved in the bearing/shaft system. The basic principle of the hydrodynamic bearing is to have said lubricating film interposed between the shaft and the sliding surface, said film enabling said shaft to rotate without contact with said sliding surface from said limit speed.

Unfortunately, the hydrodynamic bearings known by the person skilled in the art that are suitable for high loads and high speeds, such as the bearing described above, suffer from the following problems:
  loss of power by friction,
  recirculation of hot lubricant,
  excessive consumption of lubricant, requiring an overdimensioning of the cooling circuit for said lubricant in order to prevent overheating of said bearing when in use,
  instabilities at one or more rotational speeds of said shaft, notably resulting from the composition of the damping and stiffness matrices of the bearing-shaft system,
  an axial flow of lubricant in a direction substantially aligned with the longitudinal axis of rotation of said rotary shaft, said flow further increasing the losses caused by spray from the gears located close to said bearing.

SUMMARY OF THE INVENTION

One purpose of the present invention is to propose a new type of hydrodynamic bearing that helps to reduce power losses caused by friction, lubricant consumption, instabilities and said lubricant flow, notably an axial lubricant flow, and to reduce losses caused by spray from gears.

For this purpose, a hydrodynamic bearing is described by the characteristics of the independent claim.

A set of subclaims also sets out advantageous embodiments of said bearing according to the invention.

The present invention therefore notably relates to a hydrodynamic bearing including a body extending in particular axially along a longitudinal axis A, said body having an inner surface forming a cavity or opening that is for example cylindrical and that also extends in particular axially along said axis A and radially about said axis, said cavity being notably open at each of the axial ends thereof and being designed to receive and surround a rotary shaft, which is usually cylindrical, extending axially along said axis A. In particular, said axis A is an axis of revolution of said cavity. According to the present invention, a plurality of pads are mounted, preferably in an oscillating manner in relation to the inner surface of said body, and installed in said cavity, for example on said inner surface of said body, such as to support said rotary shaft and to guide same in rotation about the longitudinal axis of rotation thereof in a direction of rotation w from "upstream" to "downstream". The pads of the bearing according to the invention may for example be curved pads (i.e. in the form of a sector of a hollow cylinder) extending over a portion of the circumference of the inner surface, with the width thereof extending axially along said axis A. Each pad in particular has an upper face oriented toward the center of the cavity, i.e. oriented toward said rotary shaft, and including an active surface designed to act as a sliding surface for said rotary shaft. Said active surface according to the invention is the surface of the pad that is liable to come into contact with said rotary shaft, for example when this latter is bearing against said pad. As opposed to the upper face, the pad has a lower face oriented toward the inner surface of said body and resting for example at least partially against said inner surface. Preferably, each pad, or more precisely the upper face of each pad, can thus be defined as having an active surface and an inactive surface, the active surface including all of the surfaces of the upper face of the pad that are at a minimum radial distance M from the longitudinal axis of rotation of said rotary shaft, as opposed to the "inactive" surface, which includes all of the surfaces of the pad that are at a radial distance M' greater than M and that therefore cannot come into contact with said rotary shaft when this latter bears against said pad, for example when this latter is no longer in rotation. Preferably, said body is ring shaped, the cavity then simply being a cylindrical opening at the center of the ring, i.e. of the annular body, said ring including said pads installed on the inner periphery thereof that forms said inner surface, the diameter of the cavity then being for example equal to 2M.

The bearing according to the invention includes in particular:

at least one pad contained, for example at least in part, within an active angular sector of said bearing and at least one pad contained, for example at least in part, within a passive angular sector of said bearing, said active angular sector being defined, as opposed to the passive angular sector, as the bearing portion absorbing the greatest load or force generated by the rotary shaft when the bearing is supporting and surrounding said rotary shaft and the latter is in rotation. It is indeed well known to the person skilled in the art that the distribution of forces exerted by the rotary shaft in rotation on said bearing is not uniform and thus the forces exerted by the rotary shaft in rotation on certain portions of the cavity of said bearing are greater than the forces exerted by the rotary shaft in rotation on other portions of the cavity of said bearing. This makes it possible to define at least two zones or portions of the bearing when considering the whole of the forces exerted by the shaft in rotation on the walls of the cavity, or indirectly on the inner surface of the body of said bearing: respectively a zone absorbing the greatest load, i.e. where the value of the forces exerted is greatest and which corresponds to the active angular sector, and a zone absorbing the least load, i.e. where the value of the forces exerted is least and which corresponds to the passive angular sector. According to the present invention, this passive angular sector and respectively this active angular sector includes at least one pad positioned entirely or partially within said passive or active angular sector, respectively. Typically, the active angular sector is located toward the top of the bearing, as shown in FIG. 4 (active sector 2A) and the passive angular sector is typically positioned toward the "bottom" of said bearing (passive sector 2B). Preferably, any pad positioned at least partially within an active angular sector is considered to be fully part of said active angular sector, at least one injector arranged between two pads, said pads being for example consecutive in said direction of rotation w, preferably attached to said body, and designed to supply lubricant to said upper face, in particular said active surface, at least one deflector arranged between two pads, said pads being for example consecutive in said direction of rotation w, preferably attached to said body and designed firstly to reduce the recirculation of lubricant on said upper face and second to guide a flow of said lubricant from the upper face laterally toward at least one lateral lubricant drainage groove ("laterally" means in a direction substantially parallel to said axis A toward said lateral groove for draining said lubricant), characterized in that the active surface of at least one, in particular each, pad of the passive angular sector is lower than the active surface of each of the pads of the active angular sector.

Preferably, the active surface of each of said pads of the active angular sector has a smooth surface in the form of a central strip in relation to the width of said pad, said smooth surface thus extending, in the direction of rotation w, i.e. about the circumference of said cavity, unbroken from one end to the other end of said pad, and, across the width of said pad, i.e. along the axis A, over a central portion of said pad, preferably only over a central portion of said pad. The upper face of the pad according to this embodiment thus includes, for example, an inactive surface formed by two lateral strips of smooth surfaces extending unbroken from one end to the other of said pad and laterally edging said central active-surface strip of said pad.

Preferably, the active surface of at least one pad of the passive angular sector has a sculpted surface designed for example to create secondary grooves oriented toward said lateral groove such as to guide said lubricant toward the latter when the rotary shaft is in rotation. According to this embodiment, said secondary grooves are formed from the active surface into the thickness of said pad, the "bottom" of said secondary grooves then belonging to the inactive surface of said pad and enabling said lubricant to be collected and guided toward said lateral grooves. In particular, said active surface of said pad of the passive angular sector has a smooth surface in the form of a central strip, as described above, and two sculpted-surface lateral strips arranged on either side of the smooth surface along said width of said pad, i.e. respectively on one lateral side of the strip-shaped smooth surface and on the other lateral side of said strip-shaped smooth surface, each of said sculpted-surface lateral strips having said secondary grooves used to guide a flow of lubricant from said central-strip-shaped smooth surface toward said lateral lubricant-drainage grooves. Preferably, at least one or each secondary groove forms an oblique angle with a plane perpendicular to said axis A. In particular, said secondary grooves are the arms of a chevron or a "V", the point of which is in the central portion of the pad or belongs to said central-strip-shaped smooth surface.

According to a preferred embodiment, the bearing according to the invention in particular includes an annular lateral ring arranged laterally against the body of said bearing and designed to prevent an axial flow (i.e. oriented along the axis A) of said lubricant out of said cavity, said lateral ring being preferably attached to said bearing body such as to create said lateral groove. In particular, the lateral groove or said lateral ring has at least one calibration orifice to control a rate of lubricant leakage from said bearing, said calibration orifice in particular including a leakage rate adjustment system, for example using a screw system. Said bearing according to the invention in particular includes a first lateral groove and a second lateral groove that are arranged laterally on either side of said bearing, each one preferably being formed by attachment of a lateral ring to the body of said bearing. Said first and second lateral grooves are notably designed to prevent an axial flow of lubricant out of the bearing, each lateral groove being able to collect an axial flow from said active surface of the pads of said bearing and to guide same such that said flow is drained radially to the outside of said bearing, notably via said calibration orifice. Each of the lateral grooves cooperates notably with the deflectors to drain the lubricant laterally.

According to the present invention, at least two consecutive pads are preferably coupled to one another by an elastic system that is designed to limit any angular floating of said pads. For example, the end of one of said pads is coupled by said elastic system to the closest end of at least one of the neighboring pads thereof, said elastic system including for example an open elastic ring, each end of which is coupled to a respective pad. Preferably, each pad is coupled to each of its closest neighboring pads by said elastic system.

Preferably, the deflector according to the invention has a first portion and a second portion, each extending for example axially along said axis A over at least some and preferably all of the width of said bearing, the first portion being designed to be arranged upstream of the second portion in relation to the direction of rotation w and beneath the level of the active surface of the closest pad or pads when said deflector is fitted to said bearing, said first portion being designed to recover and drain said lubricant laterally, the second portion extending radially toward the center of the cavity notably up to a radial distance separating same from the center of the cavity equal to the radial distance separating said closest active surface or surfaces from said center of the cavity, for example extending at most as far as said radial distance M, such as to at least partially prevent a movement of said lubricant from a zone upstream of said second portion to a zone downstream of said second portion, said second portion also preferably extending upstream above the first portion (i.e. such as to overhang said first portion or in other words to form a projection radially to the vertical of said first portion in a centripetal direction). In particular, the second portion includes a flat upper surface inscribed or contained in a plane, the extension of which is tangent to at least one active surface of one of the closest pads, said flat upper surface extending in an upstream direction to overhang at least a portion of said first portion. According to the present invention, "beneath the level of the active surface" means that the first portion is further away from the center of the cavity than the active surface. Indeed, according to the present invention, the concepts "above" and "beneath" are defined in relation to the center of the cavity, and thus an object O1 is above and respectively beneath an object O2 if the object O1 is placed in a radial position nearer to, or respectively further away from, the center of the cavity in relation to the position of the object O2. Furthermore, the distance in relation to the center of the cavity is preferably and generally the radial distance separating a point or an object from said axis A, said axis A being in particular an axis of revolution of the cavity notably if the latter is cylindrical.

In particular, each injector and/or each deflector is attached removably to said body of said bearing, for example in a space between two successive pads, and said space can be formed in or hollowed out from the body of said bearing, at least in part, and opens out notably toward said cavity. Preferably, each space designed to receive an injector and/or a deflector is oblong in shape, the length of said space being oriented axially, i.e. along the width of said bearing, extending for example over the entire width of said bearing. Each space in particular has at least one radial opening that is for example hollowed out of the body of said bearing, that is oriented toward the outside of said bearing and that is formed for example by one or more channels oriented substantially radially toward the outside of said bearing, in order to enable lubricant to be supplied to said injector, notably radially from the outside of said bearing, or the lubricant recovered by the deflector to be drained, said lubricant being then drained radially toward the outside of said bearing, for example at the axial ends of said space.

Preferably, the deflector has an oblong body designed to be inserted into said space, said oblong body being formed by said first portion and said second portion, which are both also oblong shaped. An axial section of said first portion, i.e. along the length thereof, and in a plane passing through said axis A and extending radially to intersect said deflector along the length thereof when the latter is installed in one of said spaces, in particular forms a triangular shape or is preferably triangular, for example an isosceles triangle, the triangular shape having in particular an axis of symmetry splitting the width of the pads, or the length of said first portion, into two equal portions, and an apex pointing toward said axis A. In particular, said apex is an apex common to the two sides of equal length of said isosceles triangle and points toward said axis A when said deflector is inserted into said space and is positioned in the median plane of the pad, i.e. the plane splitting said pad along the width thereof into two portions of equal width. In particular, said apex belonging to said first portion is thus located beneath the level of the active surface of the closest pad or pads when said deflector is installed in said space to recover said lubricant and to guide same laterally along slopes joining at said apex and forming the sides of the triangular shape, said lubricant being guided along said slopes such as to move away from the center of the cavity or of the rotary shaft as far as the lateral drainage grooves. Said slopes are for example the sides of equal length of said isosceles triangle. Preferably, said section forming said triangular shape is constant along the width of the first portion of said deflector.

According to a preferred embodiment, said section forming a triangular shape is kept constant from upstream to downstream along the entire width of said first portion, said deflector then forming, directly downstream of said first portion forming the constant triangular section, said second portion of said deflector, which for example has a rectangular axial section, said second portion thus being potentially parallelepipedic, said second portion forming in particular a side or face oriented toward the center of the cavity and for which the radial distance separating said side from said center of the cavity or from the axis A is equal to the radial distance separating the active surface of the closest pad or pads from the center of the cavity or the axis A. Optionally, said side includes an extension oriented upstream, partially covering the first portion of said deflector characterized by said section forming a triangular shape, without however touching this latter, i.e. in a contactless manner in relation to this latter, such as to form said overhang above said section forming the triangular shape of said first portion. In particular, said extension extends upstream over the entire length of the first portion of said deflector. Advantageously, this section forming the triangular shape of said first portion, optionally in cooperation with said portion of rectangular section that can form said extension at least partially overhanging the section forming the triangular shape, enables the efficient recovery and lateral drainage of the lubricant during rotation of the rotary shaft, notably symmetrically along each of the sides of the triangular shape of the first portion of said deflector.

The injector according to the invention is either a device separate from said deflector, i.e. the injector and the deflector are two distinct devices, or is built into said second portion of said deflector, the first and second portions of said deflector thus forming an "injection/deflection" device, i.e. the deflector also performs the injection function on account of the features of the second portion thereof, as shown below in FIG. 7. In this latter case, the second portion of said deflector includes said injector and also has all of the features of said injector, as described below.

Said injector, for example the second portion of said deflector in the case of a deflector incorporating the injection function, preferably comprises an oblong body designed to be mounted in one of said spaces, for example between two successive pads. Said oblong body is preferably substantially parallelepipedic, and is oriented lengthwise along said axis A. Said oblong body in particular includes an axial channel arranged axially along same, i.e. along the length thereof, that is closed or closable using partitioning means for each of the axial ends thereof, i.e. in the direction of said lateral drainage grooves when said injector is installed in said space, said axial channel being designed to supply lubricant to said active surface of the closest downstream pad and forming part of a lubricant feed circuit. Preferably, the position of said partitioning means can be adjusted between a closed position and an open position such as to enable the blocking of the axial ends of said axial channel to be varied, such that a flow of lubricant is prevented from leaving said axial channel via the axial ends thereof when in the closed position, and a flow of lubricant can leave said axial channel via the axial ends thereof in the direction of said lateral grooves when in an intermediate position between the open position and the closed position. The adjustment of the partitioning means advantageously makes it possible to adjust the flow rate of lubricant leaving via the axial ends of said axial channel. Said axial channel is in particular provided with a connection member enabling connection to a lubricant supply channel, said connection being possible notably via said radial opening of said space designed to receive the injector or the injection/deflection device.

Said axial channel of said injector in particular has one or more output orifices oriented toward the cavity of said bearing, for example in the direction of the axis A, in order to supply lubricant to said active surface of the pads. In particular, each output orifice is oriented, for example radially, toward a lubrication surface of said injector, which is at a radial distance from the center of the cavity or from the axis A that is substantially equal to the radial distance separating the active surface of the closest pad from the center of the cavity or the axis A, said orifices opening out onto said lubrication surface. Said lubrication surface may for example include a conduit extending for example over the entire length of said injector and onto which each of said orifices opens out. Said conduit notably enables a uniform distribution of said lubricant over the entire width of the active surface of the pad. Said orifices are notably also spaced apart from one another on said lubrication surface and in the axial direction, i.e. the length of the body of said injector. Preferably, at least some of said orifices have a diameter that is different from at least one other of said orifices such as to maintain an identical flow rate for all of the orifices of said injector. Indeed, according to the present invention, said diameter of said orifices is determined by calculating the pressure drop upstream of each orifice in the lubricant feed circuit such as to maintain said identical flow rate for each orifice, regardless of the axial position thereof along the length of said injector. Accordingly, varying the diameter of the orifices makes it possible to compensate for pressure variations in the lubricant during distribution thereof via said orifices by means of said lubricant feed circuit, such that each orifice distributes the same quantity of lubricant as a function of time.

According to a preferred embodiment of the present invention, the second portion of said deflector includes said injector in order to form said injection/deflection device. This latter is therefore made up of two portions, respectively an injection portion and a deflection portion, said injection portion being said second portion of the deflector described above incorporating said injector, and the deflection portion being formed by said first portion as described above, each injection/deflection device being designed to be installed in one of said spaces such that the deflection portion is positioned upstream of said injection portion, said injection/deflection device thus combining the injector function and the deflector function in a single removable device. Indeed, according to this preferred embodiment, said deflector and said injector form a single removable device referred to as an injection/deflection device, which can be installed in a space in said bearing, for example between two consecutive pads.

According to the present invention, the angular distance separating one injector from another injector positioned directly upstream or downstream is preferably π/n [rad], where n is the total number of injectors in said bearing, respectively the angular distance separating one deflector from another deflector positioned directly upstream or downstream is preferably π/m [rad], where m is the total number of deflectors in said bearing. In particular, m and n are equal to or greater than 2. Preferably, m=n=5. In particular, according to the preferred embodiment including said injection/deflection devices, the angular distance separating one injection/deflection device installed in a space in said bearing from a neighboring injection/deflection device installed directly upstream or downstream in the next space of said bearing is π/t [rad], where t is the total number of injection/deflection devices mounted in the spaces in said bearing. Preferably, t is equal to or greater than 3, in particular t=5.

Advantageously, said deflectors help to stabilize the shaft during rotation thereof at high speed by guiding the lubricant toward said lateral grooves, thereby reducing or eliminating an axial flow of lubricant out of said bearing, said lubricant being forced to follow a path defined by the geometric shape of said deflector that guides said lubricant toward either the first or the second lateral groove. Thus, according to the present invention, the axial flow out of the bushing of said bearing is prevented by capturing the lubricant no longer used to form the hydrodynamic film using said deflectors and guiding this latter from the deflector to one of the lateral grooves.

In particular, said lateral grooves according to the invention extend about the circumference of said cavity such as to edge each of the lateral sides of the pads of said bearing in order to collect an axial flow of lubricant. According to a first embodiment, each lateral groove can be a groove in the form of an arc of circle hollowed out of or formed in the body of said bearing such as to open out toward said cavity, and for example extending along one of the lateral edges of said body of said bearing. Each lateral groove can for example extend along at least one portion of the internal circumference of said bearing, extending for example over 180° or over all of the passive angular sectors, or preferably over the entire internal circumference of said bearing, i.e. over the entire circumference of the cavity. According to a second embodiment, each of said lateral grooves is obtained by attaching said annular lateral ring to each of the lateral sides of said bearing, said annular lateral ring having a minimum internal diameter that is substantially equal to twice the radius separating the active surface of a pad from the center of the cavity (or the axis A), the portion of the ring oriented toward said body and designed to be attached to a lateral face (i.e. along the axis A) of this latter is characterized by a structural geometry designed to form one of said lateral grooves when said ring is attached laterally to the body of said bearing. For example, said portion of the ring that is oriented toward said body is characterized by an internal diameter that is greater than said minimum internal diameter such as to create a cavity (i.e. said lateral groove) between said lateral face of said body and the portion of the ring characterized by said minimum internal diameter. In this case, said ring can be described as being formed by two rings that are rigidly connected to one another, respectively a first ring characterized by said larger internal diameter and a second ring characterized by said minimum internal diameter, said ring being designed to be mounted on a lateral side of said bearing (i.e. on one of said axial ends of said bearing) with the portion thereof formed by said first ring coming into contact with said lateral side.

Preferably, each of said lateral grooves has at least one radial opening, for example a radial bore, that is designed to be arranged to face the longitudinal end of the first portion of said deflector, and that is designed to drain the lubricant collected in the lateral groove radially to the outside of said bearing, for example toward a circulation or recirculation system for said lubricant.

BRIEF DESCRIPTION OF THE SEVERAL VIEWS OF THE DRAWING

Advantages of said bearing according to the invention and exemplary embodiments and applications are provided using the following figures, in which identical reference characters indicate identical or equivalent elements:

FIG. 1 3D view of a preferred embodiment of a hydrodynamic bearing according to the invention.

FIG. 8 3D view of a portion of the bearing according to the invention.

DESCRIPTION OF THE INVENTION

Figure 1:
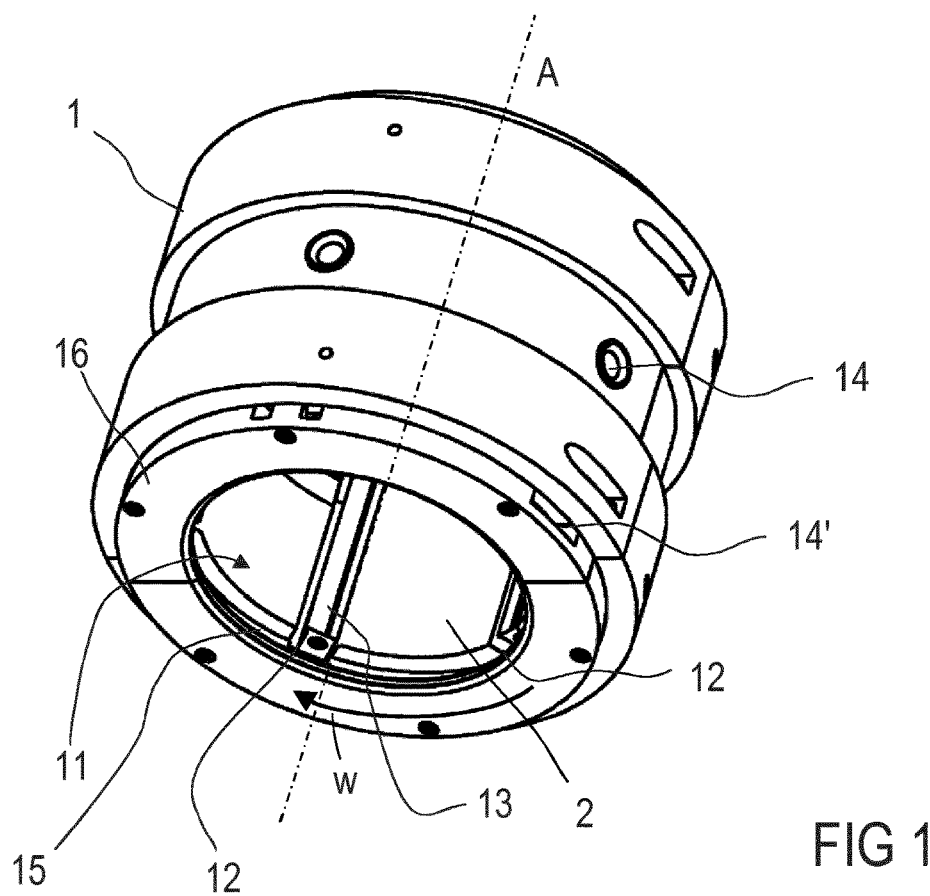
Figure 2:
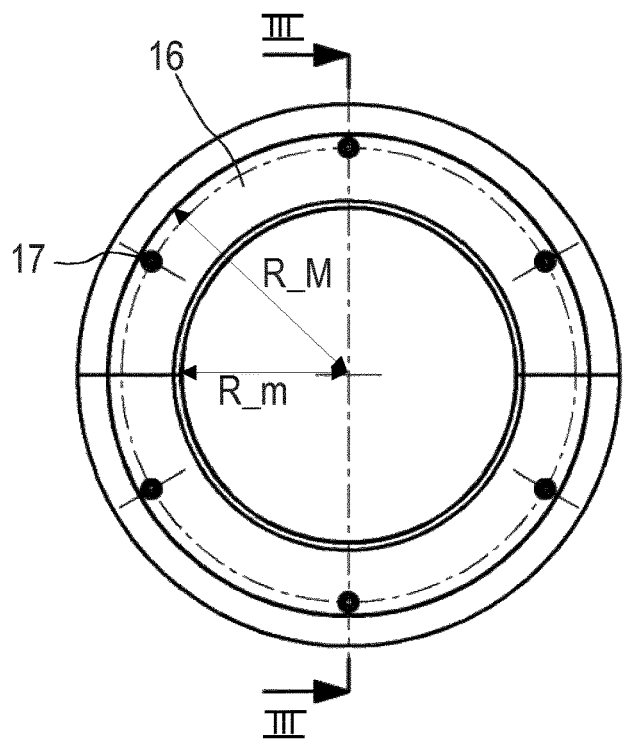
FIG. 2 Side view of a preferred embodiment of the hydrodynamic bearing according to the invention.

FIG. 1 is a three-dimensional (3D) schematic representation of a preferred embodiment of a hydrodynamic bearing according to the invention. This latter comprises an annular body 1 comprising an inner surface forming a cavity about an axial direction represented by the axis A, said body 1 of said bearing preferably being a hollow cylinder. Said body 1 is arranged to surround a rotary shaft (not shown) having a longitudinal axis of rotation that is designed to be arranged in said axial direction at the center of said body 1. In particular, said longitudinal axis of rotation and said axis A extend substantially in the same direction. Said bearing cannot rotate and is designed to facilitate a rotation of said rotary shaft in the direction of rotation w, as indicated by the corresponding arrow in FIG. 1. The direction of rotation w is oriented from upstream to downstream.

Figure 4:
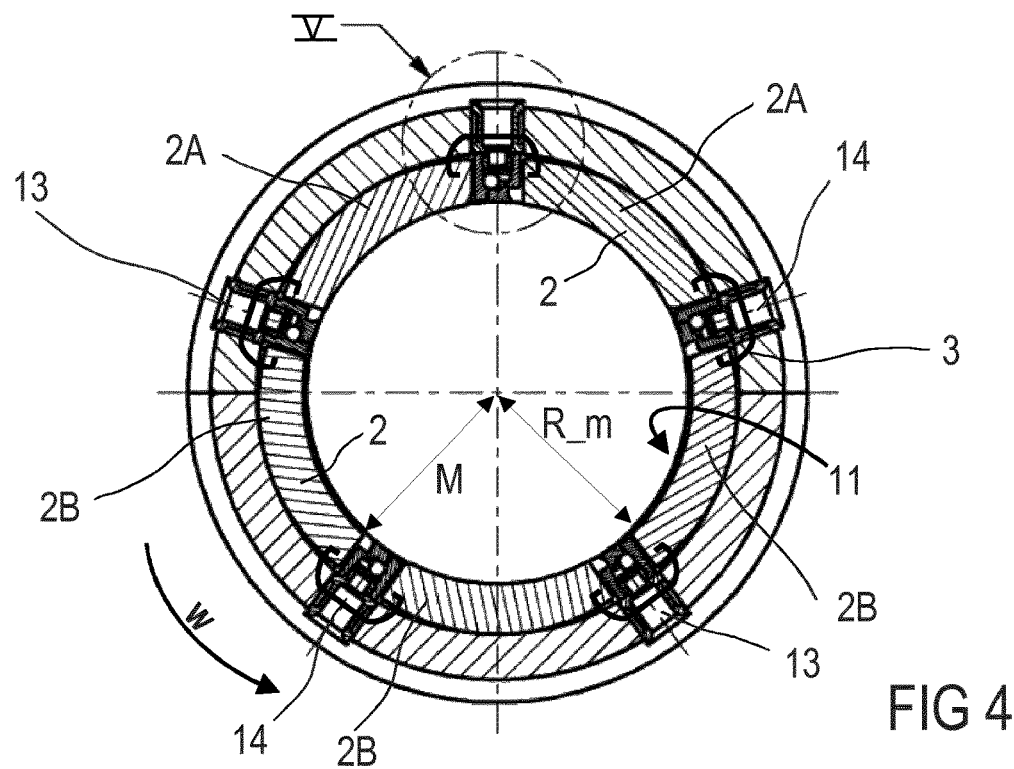
FIG. 4 Median cross-section of the bearing according to the invention, i.e. taken along the plane B-B of the bearing shown in FIG. 3.

The cavity of said body 1, or in other words the hollow portion of said bearing, is arranged to receive said rotary shaft in order to guide and support same when in rotation in a direction of rotation w from "upstream" to "downstream" about said axis A. In particular, a plurality of radial holding pads 2 for said rotary shaft are mounted, for example in an oscillating manner, on the inner surface of said body 1 forming said cavity, such as to support said rotary shaft and to guide same in rotation. For this purpose, each pad 2 has an upper face 11 with an active surface acting as a sliding surface for said rotary shaft when same is rotating in the direction of rotation w. As shown in FIG. 4 and known to the person skilled in the art, said bearing according to the invention has at least two zones, respectively a zone designed to absorb the greatest loads or forces exerted by the rotary shaft in rotation in said bearing, and a zone in which said loads or forces are minimal, each of these two zones having, according to the present invention, at least one pad 2 positioned entirely or partially in said zone, and the pad positioned entirely or partially in the minimal-force zone being characterized by an active surface beneath the pad located in all or part of the high-load zone.

Considering for example a bearing split into n zones $z_i$ (i being a value from 1 to n) including at least said zone in which the force exerted on said bearing by the rotary shaft in rotation is greatest and said zone in which the force exerted on said bearing by the rotary shaft in rotation is least, i.e. n≥2, the rotary shaft exerting a force $F_i$ on the zone $z_i$, an active angular sector is in particular defined as being all of the zones in the n zones $z_i$ of said bearing for which the force $F_i$ exerted by the rotary shaft in rotation is greater than X times the average of the forces exerted by said rotary shaft in rotation on each of said zones, X in particular being a value between 1 and 1.5, and preferably X=1.5. In other words, if $$F_i > X \cdot \frac{\sum_{i=1}^{n} F_i}{n},$$

where $X \in [1, 1.5]$ then the zone $z_i$ on which the force $F_i$ is exerted belongs to the active angular sector. Preferably, a pad at least partially within the active angular sector is considered to be fully part of said active angular sector.

According to the preferred embodiment shown in FIG. 4, at least one pad 2 is positioned or contained entirely or partially in the active angular sector 2A (i.e. said angular sector of said bearing that absorbs the greatest load generated by the rotation of said high-speed rotary shaft) and at least one pad 2 is positioned or contained entirely or in part in the passive angular sector 2B (i.e. the angular sector of said bearing that does not absorb the greatest load generated by the rotation of said high-speed rotary shaft, as opposed to the active angular sector). Preferably, each pad is mounted in an oscillating manner on the inner surface of said body 1 and about the circumference of said cavity such as to free up a space 12 between each consecutive pad, said space being designed to receive an injector and/or a deflector, or in particular an injection/deflection device 13 as shown in detail in FIGS. 5-7, said injection/deflection device 13 having at least two portions: a portion acting as an injector and a portion acting as a deflector.

Figure 8:
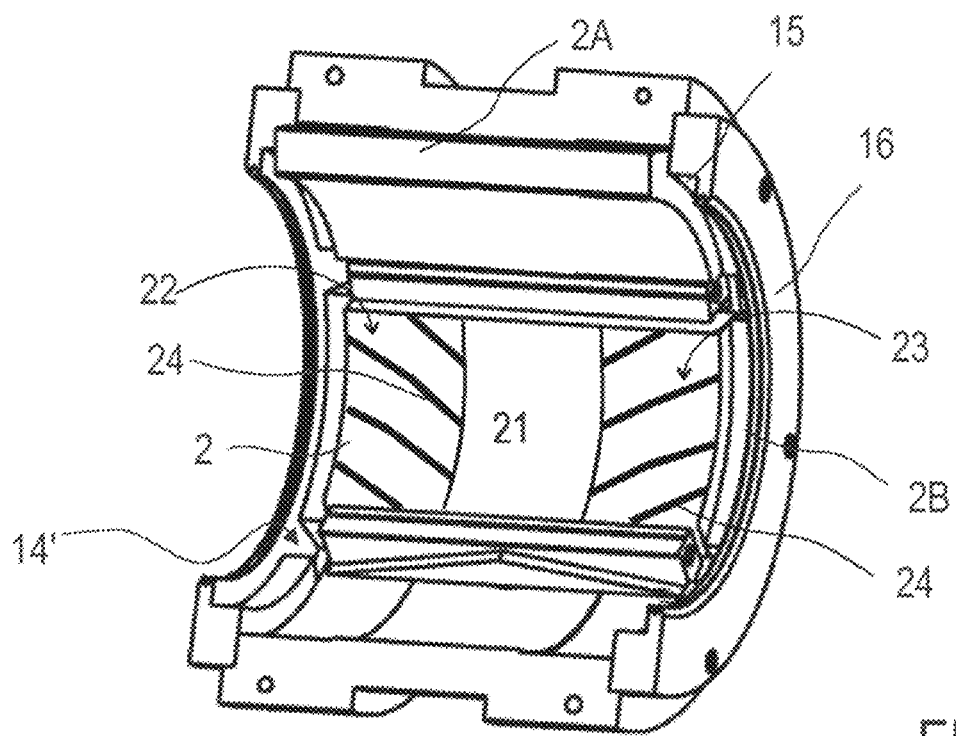

According to the present invention, each pad 2 within a passive angular sector 2B is characterized by an active surface that is lower than the active surface of a pad 2 within an active angular sector 2A. According to the present invention, the active surface of a pad includes all of the points of the upper face 11 of said pad that come into contact with said rotary shaft when the latter turns from upstream to downstream on said upper face 11. This is usually all of the points located at a radial distance M from the axis A, the radial distance M being the shortest distance separating the upper face 11 of said pad from the axis A. As shown for example in FIG. 8, the pad 2 of the passive angular sector 2B has a smooth surface 21 in the form of a central strip extending over the center (across on the width of said pad 2) of said pad 2, from an upstream end to the downstream end thereof, said smooth surface 21 being edged by two lateral strips, respectively a first lateral strip 22 and a second lateral strip 23, each of which has a set of points located at a radial distance from said axis A that is greater than M. In other words, each of the lateral strips 22, 23 includes surfaces that are radially further away from the center of the cavity than the smooth surface 21. For example, the first lateral strip 22 and the second lateral strip 23 are sculpted strips, i.e. they have geometric structures such as holes or grooves hollowed out from the upper face 11 of the pad into the body of this latter such as to reduce the active surface of said pad by creating hollow surfaces formed by sets of points that cannot come into contact with said rotary shaft when this latter is turning on the upper face 11 of the pad, or, in other words and in particular, sets of points located at a radial distance from the axis A that is greater than M. For example, the first lateral strip 22 and the second lateral strip 23 have nominal surfaces located at the same level as the smooth surface 21, but are provided with secondary grooves 24 hollowed out of the thickness of the pad toward the lower face of said pad and designed to collect the lubricant and to guide same toward the lateral grooves 15, which for example make it possible to drain same by gravity or pumping via radial openings 14'. Preferably, the secondary grooves 24 of the upper face 11 of the pads 2 of the passive angular sector 2B move from upstream to downstream obliquely in relation to a plane perpendicular to said axis A. Said grooves form for example a chevron or V-shaped structure if one secondary groove 24 or the extension thereof crosses another secondary groove or the extension thereof.

Figure 5:
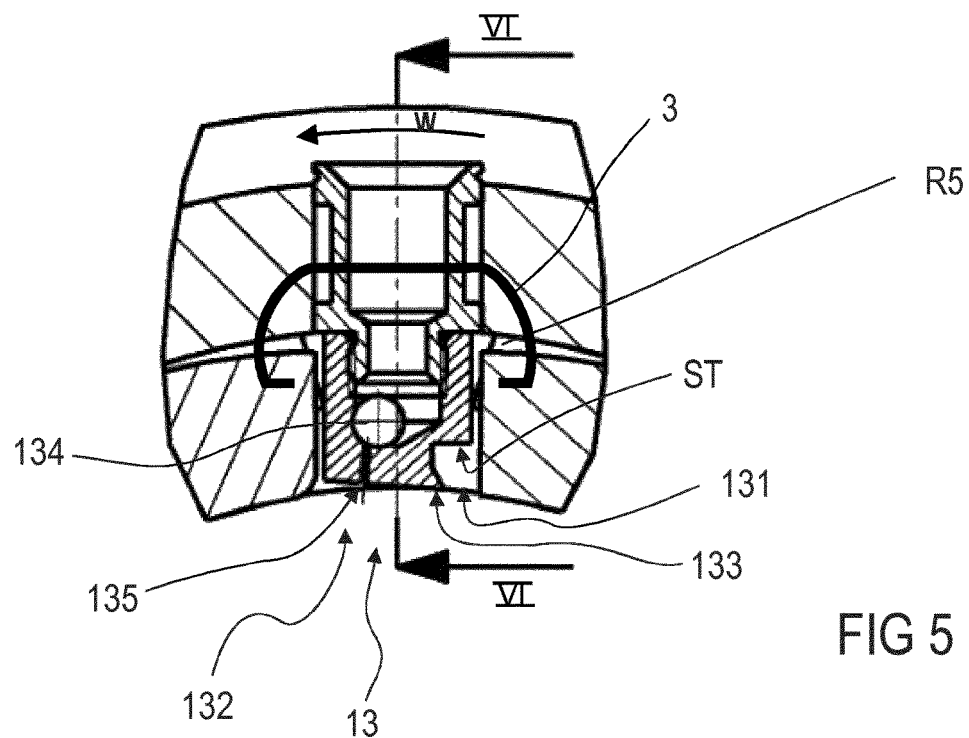
FIG. 5 Detail G of a portion of the bearing shown in FIG. 4.

As shown in FIGS. 4 and 5, the present invention in particular proposes an elastic coupling of at least two consecutive pads, or preferably of each pad 2 with the closest neighboring pads, by means of an elastic system 3, for example an open metal ring. Said elastic system 3 is designed to couple a downstream end of a pad to an upstream end of the pad positioned directly downstream, for example passing beneath said injector and/or deflector if the latter is positioned between said downstream end of the pad and said upstream end of the consecutive pad positioned downstream. As shown in FIG. 5, the pads are preferably mounted in an oscillating manner in relation to the inner surface of said body 1, a space R5 being freed up notably between the upstream end, and respectively the downstream end, of the pad and the inner surface of said body such that said pad 2 can move about an axis parallel to said axis A or about a ball joint. The elastic system 3 according to the invention advantageously makes it possible to stabilize the movement of the rotary shaft in rotation by limiting vibrations.

According to the preferred embodiment shown in FIG. 1, each space 12 is an oblong cavity, in particular parallelepipedic, the width of which is oriented along the axis A, said cavity being open in the direction of said axis A and the walls thereof being formed for example by the upstream end of a pad, the downstream end of the neighboring pad positioned directly upstream, and the inner surface of said body 1. In other words, said space 12 is preferably the space between two consecutive pads and the inner surface of said body 1. Each space 12 notably has a radial opening 14 that is preferably centered along the length of said space 12, or notably in relation to the width of said body 1, and that opens radially toward the outside of said bearing such as to enable lubricant to be supplied to an interstice located between the rotary shaft and the pads, said supply being provided by means of a lubricant feed circuit ending in a channel 134 opening out into said cavity, as explained below.

Figure 3:
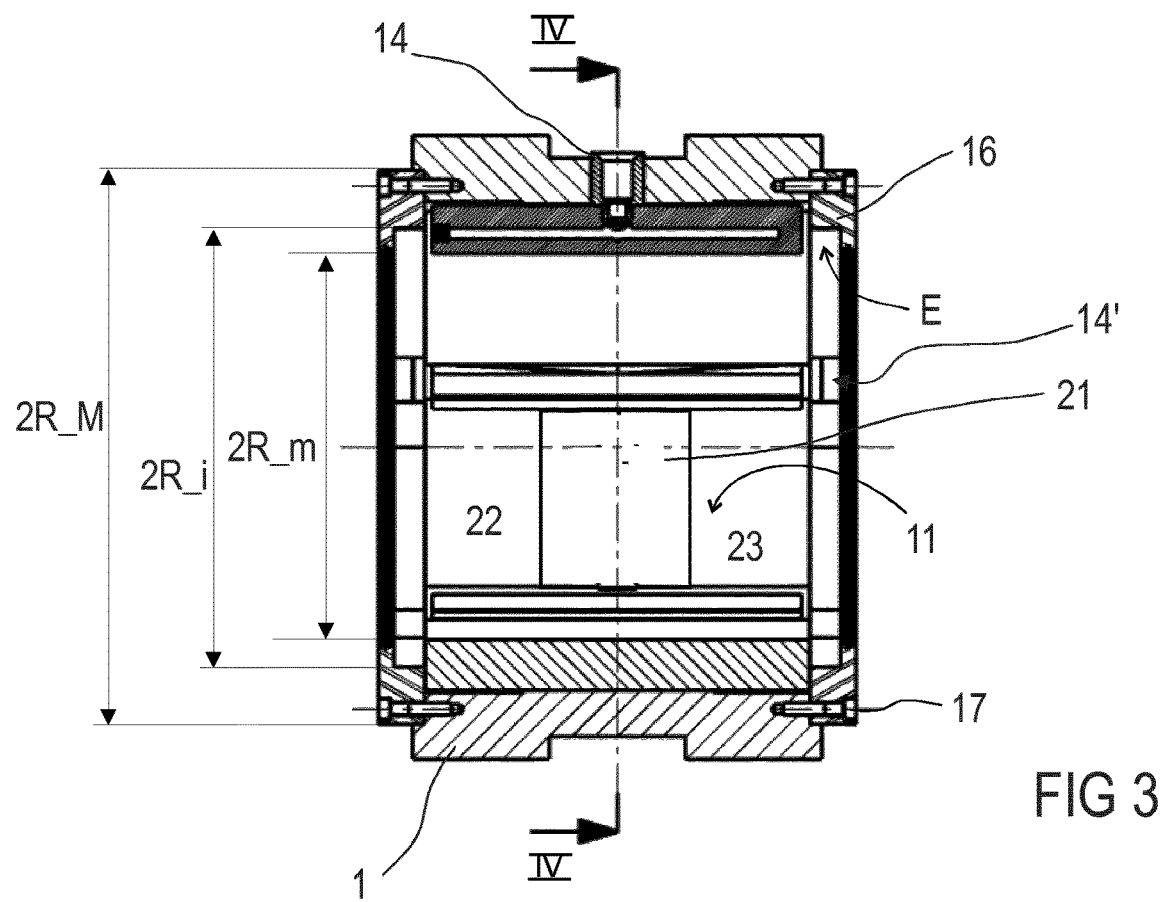
FIG. 3 Cross-section of the bearing according to FIG. 2 taken along the plane A'-A'.

The lateral grooves 15 according to the present invention can be made in various different ways. According to a first embodiment (not shown), each lateral groove can for example be hollowed out of the body 1 of said bearing, along at least one portion of the circumference of the cavity formed by the inner surface of said bearing, each one bordering one of the lateral sides (i.e. along the axis A) of said bearing and limiting said inner surface laterally. As shown in FIGS. 1 to 4, said lateral grooves 15 can also be made by attaching a lateral ring 16 in the shape of a ring or ring portion against each lateral side of said bearing (said ring, respectively ring portion, being circular, respectively a circle sector). Preferably, said lateral ring 16 is characterized by a minimum internal radius $R\_m$ that is substantially equal to the radial distance M separating the active surface of the pads from said axis A or from said center of the cavity of said bearing and optionally by a maximum internal radius $R\_i$ that is greater than said minimum internal radius $R\_m$. Such a lateral ring 16 with two internal radii $R\_m$ and $R\_i$ is shown in FIG. 3 and can be formed by a first circle of radius $R\_i$ rigidly connected to a second circle of radius $R\_m$. Preferably, the maximum external diameter $2R\_M$ of the lateral ring 16 is less than the external diameter of said bearing. Due to the arrangement of the two internal radii, respectively $R\_i$ and $R\_m$, attachment of said lateral ring 16 against a flank or lateral side of said bearing enables a space E to be created between the portion of the lateral ring 16 characterized by said minimum internal radius $R\_m$ and the body of said bearing, said space E being designed to form said lateral groove 15. The lateral ring 16 can also be designed such that said space E opens out radially toward the outside of said bearing, such as to create said radial opening 14' enabling the radial drainage of the lubricant recovered in said space E by a deflector or by a secondary groove 24. Preferably, attachment means 17, for example a screw system, enables each lateral ring 16 to be attached to the lateral side of said bearing. Optionally and according to a specific embodiment (not shown) of said attachment means, the lateral ring 16 only has one minimum internal radius $R\_m$ and said attachment means enable said space E to be created between the lateral ring 16 and the flank of the bearing, and said space E can also open radially outward to enable a radial drainage of the lubricant through said radial openings 14'.

The bearing according to the invention can include several injectors designed to supply the upper face 11 of the pads 2 with lubricant, as well as several deflectors to manage the flow of lubricant over said upper face 11. Preferably, said injectors and deflectors are paired to form said injection/deflection device 13. According to this preferred embodiment, the bearing according to the invention thus includes a set of injection/deflection devices 13 distributed uniformly (i.e. the circumferential length separating two injection/deflection devices from each other is constant) in relation to the circumference of the cavity of the bearing. FIG. 4 shows a specific example of the bearing according to the invention including five injection/deflection devices 13, each of which is arranged in the space 12 between two successive pads 2. The detail G in FIG. 4 is shown in FIG. 5.

Figure 6:
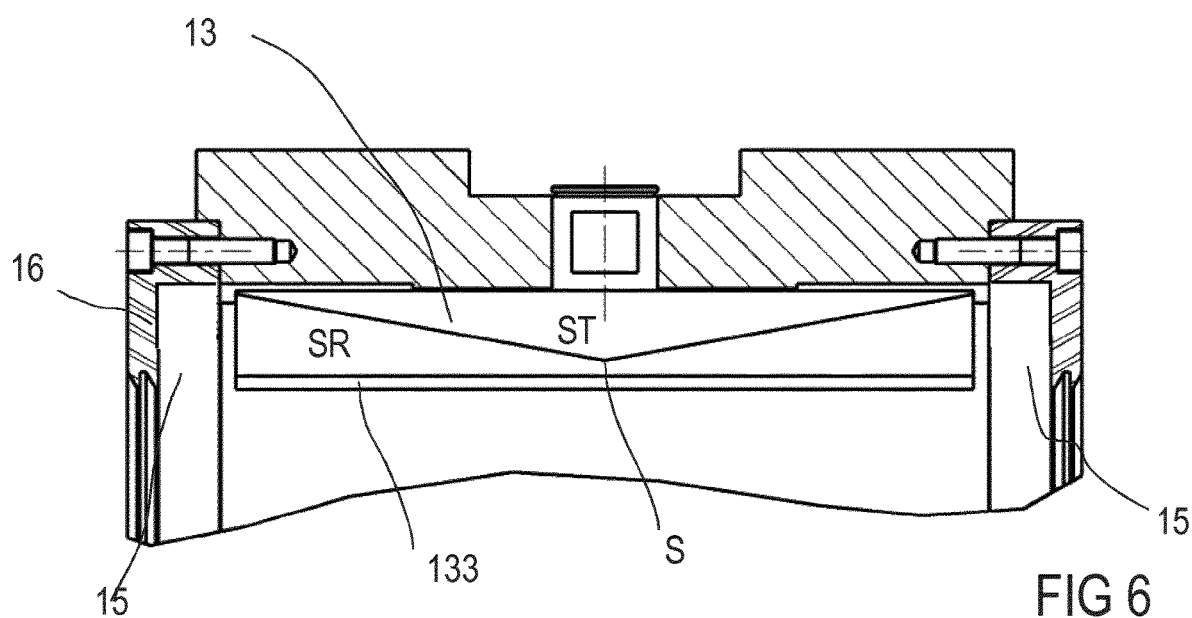
FIG. 6 Cross-section of detail G shown in FIG. 5, taken along the plane A'-A'.
Figure 7:
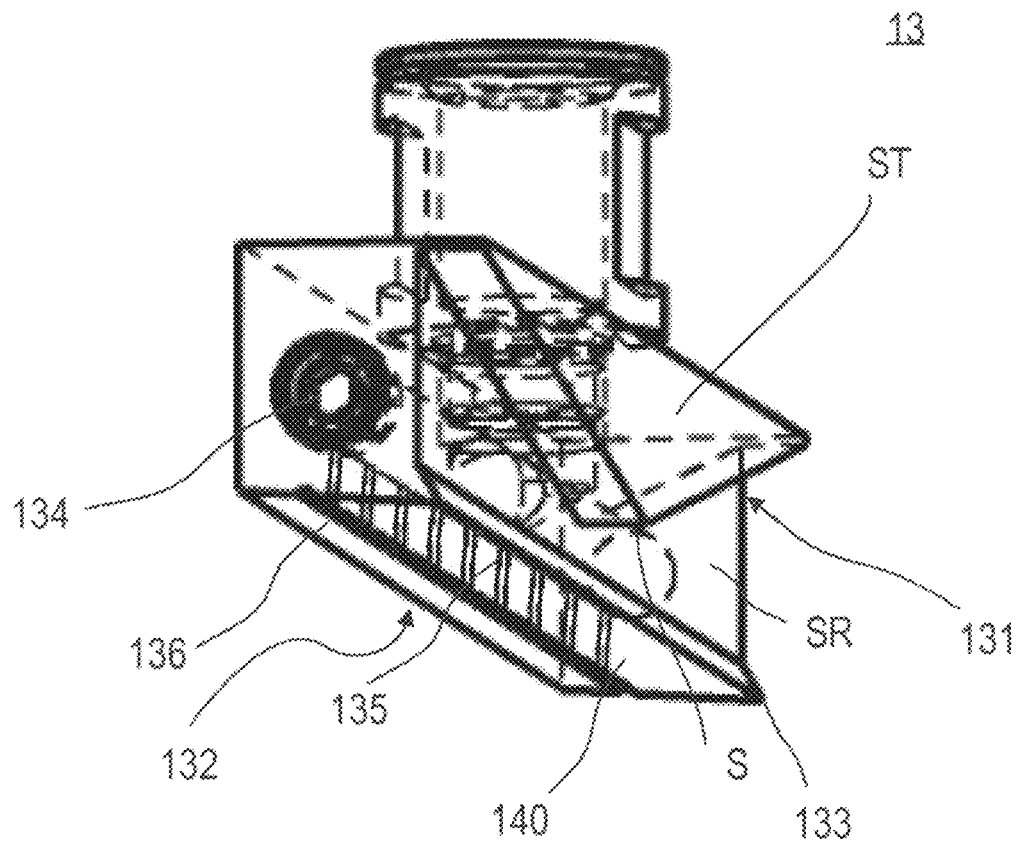
FIG. 7 Exemplary embodiment of an injection/deflection device according to the invention.

As shown in FIGS. 5-7 and as explained above, a deflector according to the invention and also incorporating the injection function forms an injection/deflection device 13 that then includes an injection portion that is said second portion 132 of said deflector that incorporates the injector, and a deflection portion designed to collect lubricant and formed by the first portion 131 of said deflector.

Said first portion 131 of the injection/deflection device is designed to be positioned upstream of the second portion 132 in relation to the direction of rotation w of the rotary shaft when the injection/deflection device is installed in said space 12. The first portion 131 in particular includes a portion characterized by a triangular section ST with an apex S that is designed to point radially toward the cavity of said bearing, as shown in FIG. 6 when said injection/deflection device 13 is installed in the space 12 of said bearing. The apex S of the triangle designed to point radially toward said cavity is positioned beneath the level of said active surface of the closest pad or pads, and the sides leading from said apex S each extending from said apex toward one of the lateral grooves 15. Preferably, said first portion 131 is limited, downstream, by said second portion 132 of said injection/deflection device 13, which is characterized by a substantially rectangular section SR. Said second portion 132 notably has an upper surface, referred to as the lubrication surface 140, that lies in a plane, in which the extension of said plane is tangent to the closest active surface. Preferably, said second portion 132 includes an extension 133 that at least partially overhangs said triangular section ST.

Preferably, said second portion 132 includes a cavity forming a channel 134 extending over the entire length along said axis A of said second portion 132, said channel 134 communicating via the radial opening 14 with a lubricant supply and opening out via orifices 135 into said cavity, for example substantially at said lubrication surface 140 in order to supply lubricant to an interstice formed between the active surface of the pads and the rotary shaft. In particular, each of said orifices 135 opens out into a conduit 136 hollowed out of said lubrication surface 140 of said second portion 132.

Preferably, said lubrication surface 140 is substantially flat and includes said extension 133 that at least partially overhangs said first portion 131 of triangular section ST. According to this embodiment, said conduit 136 is positioned downstream of said extension 133 when said injection/deflection device is installed in a space 12 between two consecutive pads. In particular, the upstream end of said extension 133 is at the same level as the active surface of the closest pad and the downstream end of said lubrication surface 140 is positioned slightly below said active surface of the closest pad, i.e. further away from the rotary shaft than the active surface of the closest pad.

In conclusion, the present invention proposes a new type of hydrodynamic bearing including pads 2 with a reduced active surface where said pads are fitted to a passive sector of said bearing. Optionally, an elastic system couples said pads such as to stabilize the rotation of said bearing, and removable injection/deflection devices 13 that can be inserted between said pads 2 firstly enable lubricant to be injected into an interstice between the active surface of the pad and the rotary shaft, and secondly to divert a lubricant flow toward lateral grooves or slots 15 such that the lubricant heated during the work of the rotary shaft is guided toward said lateral grooves 15 to be drained out of said bearing.

The invention claimed is:

1. A hydrodynamic bearing, comprising:
   a plurality of pads;
   a body having an inner surface defining a cavity configured to receive and surround a rotary shaft, said cavity provided with said plurality of pads installed on said inner surface such as to support said rotary shaft and to guide same in rotation in a direction of rotation from upstream to downstream, each of said pads having an upper surface of which a portion of said upper surface, referred to as an active surface, acts as a sliding surface for the rotary shaft; and
   said plurality of pads including at least one pad included in an active angular sector of the hydrodynamic bearing and at least one pad included in a passive angular sector of the hydrodynamic bearing, and said active surface of said at least one pad of said passive angular sector is lower than said active surface of each of said pads of said active angular sector, wherein said active surface of said at least one pad of said passive angular sector having at least one strip-shaped smooth surface extending unbroken from an upstream end to a downstream end of said at least one pad and, across a width of said at least one pad, over a central portion of said at least one pad.

2. The hydrodynamic bearing according to claim 1, further comprising:
   at least one injector configured to supply a lubricant to said upper surface; and
   at least one deflector configured to reduce recirculation of the lubricant over said upper surface.

3. The hydrodynamic bearing according to claim 1, further comprising an elastic system and at least two consecutive ones of said pads are coupled to one another by said elastic system that is configured to limit an angular floating of said pads.

4. The hydrodynamic bearing according to claim 3, wherein each of said pads is coupled to each of a closest neighboring one of said pads by said elastic system.

5. A hydrodynamic bearing, comprising:
   a plurality of pads;
   a body having an inner surface defining a cavity configured to receive and surround a rotary shaft, said cavity provided with said plurality of pads installed on said inner surface such as to support said rotary shaft and to guide same in rotation in a direction of rotation from upstream to downstream, each of said pads having an upper surface of which a portion of said upper surface, referred to as an active surface, acts as a sliding surface for the rotary shaft;
   said plurality of pads including at least one pad included in an active angular sector of the hydrodynamic bearing and at least one pad included in a passive angular sector of the hydrodynamic bearing, and said active surface of said at least one pad of said passive angular sector is lower than said active surface of each of said pads of said active angular sector;
   said body having a lateral groove formed therein and extending along at least one portion of a circumference of said body; and
   said active surface of said at least one pad of said passive angular sector containing a sculpted surface having secondary grooves formed therein and oriented toward said lateral groove.

6. The hydrodynamic bearing according to claim 5, wherein at least one or each of said secondary grooves forms an oblique angle with a plane perpendicular to an axis of rotation of the rotary shaft.

7. A hydrodynamic bearing, comprising:
   a plurality of pads;
   a body having an inner surface defining a cavity configured to receive and surround a rotary shaft, said cavity provided with said plurality of pads installed on said inner surface such as to support said rotary shaft and to guide same in rotation in a direction of rotation from upstream to downstream, each of said pads having an upper surface of which a portion of said upper surface, referred to as an active surface, acts as a sliding surface for the rotary shaft;

said plurality of pads including at least one pad included in an active angular sector of the hydrodynamic bearing and at least one pad included in a passive angular sector of the hydrodynamic bearing, and said active surface of said at least one pad of said passive angular sector is lower than said active surface of each of said pads of said active angular sector; and an annular lateral ring disposed laterally against said body and configured to prevent a lateral flow of a lubricant out of said cavity.

8. The hydrodynamic bearing according to claim 7, wherein said lateral ring has at least one calibration orifice formed therein to control a rate of lubricant leakage from said hydrodynamic bearing.

9. The hydrodynamic bearing according to claim 8, wherein said calibration orifice includes a leakage rate adjustment system.

10. A hydrodynamic bearing, comprising:
a plurality of pads;
a body having an inner surface defining a cavity configured to receive and surround a rotary shaft, said cavity provided with said plurality of pads installed on said inner surface such as to support said rotary shaft and to guide same in rotation in a direction of rotation from upstream to downstream, each of said pads having an upper surface of which a portion of said upper surface, referred to as an active surface, acts as a sliding surface for the rotary shaft;
said plurality of pads including at least one pad included in an active angular sector of the hydrodynamic bearing and at least one pad included in a passive angular sector of the hydrodynamic bearing, and said active surface of said at least one pad of said passive angular sector is lower than said active surface of each of said pads of said active angular sector;
at least one injector configured to supply a lubricant to said upper surface; and
at least one deflector configured to reduce recirculation of the lubricant over said upper surface, wherein said deflector having a first portion and a second portion, said first portion being positioned upstream of said second portion at a radial distance that is further away from a center of said cavity than said active surface of a closest one of said pads, said second portion extending upstream such as to form an overhang over said first portion.

11. The hydrodynamic bearing according to claim 10, wherein said second portion extends at least partially on one side radially toward the center of said cavity up to a radial distance separating same from the center of said cavity that is equal to the radial distance separating the center of said cavity from said active surface of said closest pad in said second portion, and on the other side upstream to form said overhang.

12. The hydrodynamic bearing according to claim 10, wherein said second portion has a flat lubrication surface inscribed within a plane, an extension of said flat lubrication surface is tangent to said at least one active surface of one of said closest pads, said flat lubrication surface extending upstream to form said overhang.

13. The hydrodynamic bearing according to claim 10, wherein said second portion of said deflector incorporates said injector.

14. A hydrodynamic bearing, comprising:
a plurality of pads;
a body having an inner surface defining a cavity configured to receive and surround a rotary shaft, said cavity provided with said plurality of pads installed on said inner surface such as to support said rotary shaft and to guide same in rotation in a direction of rotation from upstream to downstream, each of said pads having an upper surface of which a portion of said upper surface, referred to as an active surface, acts as a sliding surface for the rotary shaft;
said plurality of pads including at least one pad included in an active angular sector of the hydrodynamic bearing and at least one pad included in a passive angular sector of the hydrodynamic bearing, and said active surface of said at least one pad of said passive angular sector is lower than said active surface of each of said pads of said active angular sector;
at least one injector configured to supply a lubricant to said upper surface, wherein said injector having lubricant supply orifices formed therein for said upper surface, a diameter of said lubricant supply orifices varying as a function of an axial position of said lubricant supply orifices so as to maintain an identical lubricant flow rate for each of said lubricant supply orifices; and
at least one deflector configured to reduce recirculation of the lubricant over said upper surface.

* * * * *